United States Patent Office 3,196,859
Patented July 27, 1965

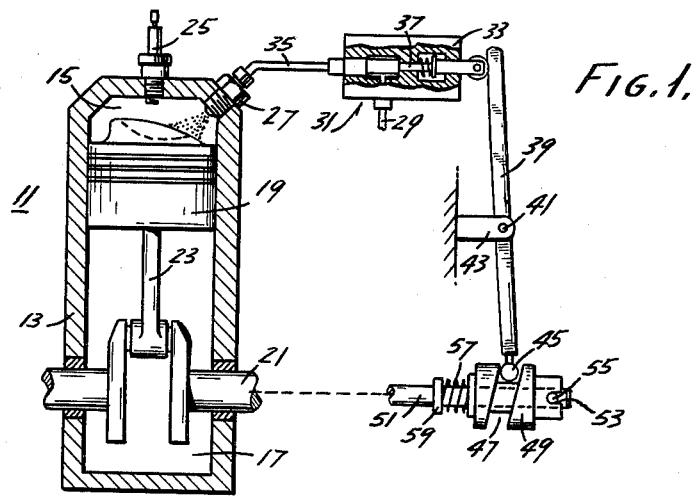

3,196,859
ENGINE
Kurt F. Ziegler, Zion, Ill., assignor to Outboard Marine Corporation, Waukegan, Ill., a corporation of Delaware
Filed Aug. 24, 1962, Ser. No. 219,294
16 Claims. (Cl. 123—139)

The invention relates generally to spark ignition, fuel injection, internal combustion engines.

The invention provides an arrangement facilitating starting and power operation of a fuel injection, spark ignition, low compression-type engine, as compared to a diesel-type engine, when using fuel of low volatility, such as for example, kerosene. In spark ignition, internal combustion engines, fuel is generally injected into the engine cylinder prior to the compression stroke when the piston is adjacent bottom dead center. When the engine is cold and low volatility fuels are injected into the engine when the piston is adjacent bottom dead center, engine starting operation is unreliable. In accordance with the invention, reliable starting operation can be obtained, even with a cold engine, with fuels of low volatility when the fuel is injected into the cylinder when the piston is at or near top dead center. In such instances, spark plug firing, which closely follows the fuel injection, ignites the relatively concentrated fuel charge to effect burning of the fuel. Sufficient power is thereby developed to turn over engine when under no load and, in general, to warm up the engine. When the engine is sufficiently warmed, load carrying or power operation can be sustained when the fuel is injected in the normal manner, i.e., when the piston is adjacent bottom dead center.

The invention can be physically embodied in an engine including a cylinder, a piston reciprocably movable in said cylinder, and a fuel pump leading to an injection nozzle in the cylinder, by providing means for selectively causing injection of the fuel either when the piston is adjacent top dead center or adjacent bottom dead center. Various arrangements can be employed to accomplish this result.

One embodiment of a two stroke engine includes a pair of cylinders, a pair of oppositely acting pistons reciprocable in said cylinders, separate fuel nozzles in said cylinders, and separate cylinder supply conduits leading to each of the nozzles. Also included is a fuel pump operable to pump a "slug" or charge of fuel for each 180 degrees of crankshaft rotation alternately into each of two other or pump discharge conduits, and means interposed between the first mentioned or cylinder supply conduits and the second mentioned or pump discharge conduits so as to enable reversal of the connections between the cylinder supply and pump discharge conduits. Thus, when the valve means is located in one position, the fuel will be alternately fed to the cylinders when the pistons are at bottom dead center. However, reversal of the connections between the pump discharge conduits and the cylinder supply conduits displaces by 180 degrees the time of fuel injection in relation to crankshaft rotation, whereby fuel is injected, alternately into the cylinders, when the pistons are adjacent top dead center to facilitate cold starting of the engine. Various arrangements including either manual or automatic control means, such as a thermostatically operated switch sensitive to engine temperature, can be used to effect reversal of the connections between the cylinder supply and pump discharge conduits.

The principles of the invention are applicable alike to two stroke and four stroke engines. In addition, as will be specifically disclosed, the principles of the invention are applicable to single cylinder engines, as well as to multiple cylinder engines. Furthermore, various physical arrangements can be employed for effecting selective injection of fuel when the engine is either adjacent top dead center or bottom dead center.

Other objects and advantages of the invention will become known by reference to the following description and the accompanying drawings wherein:

FIGURE 1 is a partially diagrammatic, sectional view of a single cylinder engine 11 embodying various of the features of the invention;

FIGURE 2 is a partially diagrammatic and partially sectioned fragmentary view of a two cylinder engine which embodies various of the features of the invention and which is shown arranged for cold starting operation;

FIGURE 3 is a view similar to FIGURE 2 showing the engine arranged for power operation; and FIGURE 4 is a fragmentary, partially sectioned view of an injection pump arrangement by which various of the features of the invention can be obtained.

The engine 11 shown in FIGURE 1 is a two stroke engine and conventionally includes an engine block 13 defining a cylinder 15 and a crankcase 17, a piston 19 reciprocably movable within the cylinder, and a crankshaft 21 extending through the crankcase 17 and connected to the piston 19 by a connecting rod 23. Mounted in the engine block 13 at the upper end or head of the cylinder 15 is a spark plug 25 which is fired by conventional means (not shown) when the piston 19 is adjacent top dead center. Also situated at the top or head of the cylinder 15 is a fuel injection nozzle 27. Various conventional arrangements can be used for supplying combustion air and for exhausting the cylinder 15 after firing of the combustible mixture. Fuel is supplied to the engine 11 from a source (not shown) through a conduit 29 to a pump means 31 in the form of an injection pump 33 which, in turn, communicates through a conduit 35 with the nozzle 27. The injection pump 33 conventionally includes a spring biased plunger 37 which is reciprocable to force fuel through the conduit 35 and nozzle 27 to the cylinder 15.

The plunger 37 can be reciprocated by various arrangements. In the disclosed construction, the plunger 37 is engaged for reciprocation by one end of a rocker arm 39 carried on a fulcrum 41 mounted on a bracket 43 which is fixed in relation to the engine 11. The other end of the rocker arm 39 constitutes a cam follower 45 engaged in a cam slot 47 formed on a cam element 49 rotated either by the crankshaft 21 or by a shaft 51 driven by the crankshaft. The cam slot 47 is formed so that the plunger 37 reciprocates to deliver a slug of fuel to the engine cylinder 15 once for every revolution of the crankshaft 21.

Reliable starting and power operation of the engine 11 are both obtained when using a low volatile fuel, such as for example, kerosene or naphtha, by controlling the timing of the fuel injection into the cylinder 15. Full power operation after the engine 11 has warmed up can be achieved with a low volatile fuel by conventionally injecting the fuel when the piston is adjacent bottom dead center. Starting of the engine 11 and warming up thereof to enable full power operation can be reliably obtained when using fuels of low volatility by injecting the fuel into the cylinder 15 in the area of the spark plug 25 when the piston 19 is adjacent top dead center. Thus, in accordance with the invention, fuel is injected in the engine during starting operation at a time which, in terms of crankshaft rotation, is displaced 180 degrees from the time of fuel injection when the engine is operating under power or load carrying conditions.

Various arrangements or means can be employed for selectively introducing fuel to the cylinder when the piston in either adjacent top dead center or bottom dead center. In the construction shown in FIGURE 1, the cam element 49 is rotatable relative to the shaft 51 and is selectively engageable with the shaft 51 to prevent rotation therebetween in either of two positions which are angularly offset from each other by approximately 180 degrees, an amount equal to the crankshaft travel during travel of the pitson between top dead center and bottom dead center.

More specifically, the cam elements 49 includes, at one end, a pair of diametrically opposite notches 53 and the shaft 51 includes a cross pin 55 which is selectively receivable in the notches 53 to locate the cam element 49 relative to the shaft 51 so as to effect fuel injection when the piston 19 is either adjacent top dead center or bottom dead center. The cam element 49 is retained by the pin 55 in either of its two releasably fixed positions by a spring 57 operating between the other end of the cam elements 49 and a shoulder 59 on the shaft 51.

In operation, when it is desired to start the engine 11, the cam element 49 is displaced along the shaft 51, to the left in FIGURE 1, against the action of the spring 57 and selectively rotated to permit receipt of the pin 55 in the particular one of the notches 53 which will provide for fuel injection when the piston 19 is adjacent top dead center. After the engine 11 is warmed up, the cam element 49 can again be shifted axially and rotatively relative to the shaft 51 to disengage the pin 55 from the first engaged notch and to engage the pin 55 in the other of the notches 53 to provide for injection of fuel when the piston 19 is adjacent bottom dead center. Thus, there is provided an arrangement whereby the operator may manually control the warm-up period and may effect shifting of the time of fuel injection between top dead center and bottom dead center.

The engine 111 shown in FIGURES 2 and 3 includes an engine block 113, incorporating a pair of cylinders 115 and 116 and a pair of respectively associated crankcases 117 and 118. Reciprocably movable in the cylinders 115 and 116 are respective pistons 119 and 120, each of which is connected through respective rods 123 and 124 with a crankshaft 121 extending through the crankcases 117 and 118 to provide for opposite action of the pistons 119 and 120 with respect to one another in their associated cylinders 115 and 116. Each of the cylinders 115 and 116 is respectively provided with a spark plug 125 and 126 and with a fuel injection nozzle 127 and 128 communicating with respective cylinder supply conduits 135 and 136. Various conventional arrangements can be employed for supplying combustion air and for exhausting the burnt products of combustion from the cylinders.

Fuel supplied to the respective cylinders 115 and 116 is provided by a pump means 131 in the form of a pump 133 which communicates through a conduit 129 with a source of fuel (not shown) and which is driven through a timing belt 161 from the crankshaft 121 so as to alternately deliver a "slug" of fuel for every 180 degrees of crankshaft rotation to each pair of pump discharge conduits. The pump discharge conduits 163 and 165 and the cylinder supply conduits 135 and 136 are connectable through valve means 167 including a housing 169 and a valve member 171 which is rotatable within the housing and which includes a pair of flow passageways 173 and 175. The valve member is shiftable between one position, shown in FIGURE 2, in which fuel delivered from the pump 133 through the discharge conduit 163 is conducted through the flow passageway 173 to the cylinder supply conduit 136 leading to the engine cylinder 116 while the other fuel discharge conduit 165 is connected through the flow passageway 175 to the cylinder supply conduit 135 leading to the engine cylinder 115. The pump 131 is connected to the crankshaft 121 so that when the valve member 171 is in the position shown in FIGURE 2, fuel is injected into the cylinders 115 and 116 when the pistons 119 and 120 are adjacent top dead center, thereby permitting starting and warming up of the engine 111.

As shown in FIGURE 3, the valve member 171 is shiftable to a second position for full power engine operation wherein the fuel discharge conduit 165 is connected through the flow passageway 175 to the cylinder supply conduit 136 leading to the engine cylinder 116 and whereas in the fuel discharge conduit 163 is connected through the flow passageway 173 to the cylinder supply conduit 135 leading to the engine cylinder 115. As the connections to the fuel discharge conduits 163 and 165 to the cylinder supply conduits 135 and 136 are reversed in the arrangement shown in FIGURE 3 as compared to the arrangement of FIGURE 2, the introduction of fuel into the cylinders 115 and 116 takes place at a time intervavl displaced from the time of fuel injection provided for in the arrangement of FIGURE 2, by an interval amounting to approximately 180 degrees of crankshaft rotation, i.e., when the pistons 119 and 120 are adjacent bottom dead center. As a result, the engine is capable of load sustaining operation.

The valve member 171 may be shiftable between either of its two positions by either manal means or by automatic means. In this regard, there is shown in FIGURE 3 a thermostatic control 177 which is connected by suitable means 181 to a temperature sensing device or bulb 179 mounted on the engine block. The thermostatic control 177 includes a plunger 183 which is connected to the valve member 171 by a connecting rod 185 and a crank 187. In operation, the plunger 183 is normally urged by a spring 189 to a position locating the valve member 171 in the position shown in FIGURE 2. However, upon warming up of the engine block, the temperature sensing device 179 effects operation of the thermostatic control 177 to cause movement of the plunger 183 so as to shift the valve member 171 to the position shown in FIGURE 3. Thus, whenever the engine 111 is cold, the valve member 171 will be automatically positioned to deliver fuel to the cylinders 115 and 116 when the pistons 119 and 120 are adjacent top dead center. However, when the engine 111 is warm, the valve member 171 will be automatically shifted to effect delivery of fuel when the pistons 119 and 120 are adjacent bottom dead center, thereby enabling load sustaining operation of the engine. The temperature responsive means just described for automatically controlling the time of fuel injection can also be adapted to shift the cam element 49 (see FIGURE 1) or to shift the cam 297 and housing 299 still to be described (see FIGURE 4), relative to each other to control the time of fuel injection.

Another arrangement for controlling the time of delivery of fuel to one or more cylinders is shown in FIGURE 4 and includes a fuel pump 233 which is adapted for delivering fuel to a multi-cylinder engine including two or more cylinders. The fuel injection pump 233 includes a separate pump unit 291 for each cylinder, which pump units 291 are operated in planned sequence to corrsespond with the firing order sequence of the cylinders. Each of the pump units 291 includes a spring biased plunger 293 which is reciprocable in a sleeve 295 to effect delivery of fuel from a fuel supply line 229 to a fuel discharge line 263 leading to an associated engine cylinder. Each of the plungers 293 is reciprocated by a cam 297 which is driven by a shaft 251 rotated in predetermined relation with the crankshaft of the associated engine.

Displacement of the time of fuel injection between when the pistons are adjacent bottom dead center and when the pistons are adjacent top dead center is provided by mounting the main body or housing 299 of the fuel injection pump for rotation relative to the housing or support means 301 mounting the cam 297. In this regard, the main body 299 of the pump includes an annular flange 303 which is carried in a bearing provided by the housing 301 and an annular collar 305 secured to the housing 301. Rotation of the main body 299 of the fuel pump 233 through 180 degrees relative to the crankshaft is obtained by providing a gear segment 307 on the outer surface of the main body 299, which gear segment 307 meshes with a connecting linkage 309 which may be either manually or thermostatically controlled.

In each of the organizations described above there is disclosed an arrangement whereby fuel may be selectively injected into an engine cylinder either adjacent top dead center or bottom dead center to respectively provide for starting of a cold engine or power sustaining operation of a warm engine when using fuels of low volatility.

Various of the features of the invention are set forth in the following claims.

What is claimed is:

1. A spark ignition, internal combustion engine including a cylinder, a piston reciprocably movable in said cylinder, a crankshaft connected to said piston, and means for selectively injecting fuel into said cylinder when said piston is in either of a first position or a second position displaced from said first position by an amount corresponding to about 180 degrees of crankshaft rotation and including a fuel injection pump and means for effecting fuel injection operation of said pump when said piston is in one of said first and second positions, said means for effecting fuel injecting operation of said pump including an actuating cam shiftable between two positions displaced from each other so as to effect pumping operation at time intervals displaced from each other by an amount corresponding to about 180 degrees of crankshaft rotation.

2. A spark ignition, internal combustion engine including a cylinder, a piston reciprocably movable in said cylinder, a crankshaft connected to said piston, a fuel injection pump, means operating said pump in timed relation to crankshaft rotation, a fuel conduit communicating with said cylinder, and means for selectively and alternatively connecting said fuel conduit to said fuel injection pump so as to inject fuel into said cylinder when said piston is adjacent bottom dead center or when said piston is adjacent top dead center.

3. A spark ignition, internal combustion engine including a pair of cylinders, a crankshaft, a pair of oppositely acting pistons reciprocably movable in said cylinders and connected to said crankshaft, and means for injecting fuel into alternate cylinders incident to each 180 degrees of crankshaft rotation, including a fuel injection pump, separate fuel conduits leading to each of said cylinders, and selectively operable means for connecting said fuel conduits to said fuel pump so as to alternatively provide injection of fuel into said cylinders when said pistons are adjacent top dead center or when said pistons are adjacent bottom dead center.

4. An engine in accordance with claim 3 wherein said selectively operable means includes a valve housing including means defining a valve chamber, a pair of spaced inlet ports in said housing communicating with said valve chamber and separately with said fuel pump, a pair of spaced outlet ports in said housing communicating with said valve chamber and sepaartely with said fuel conduits, and a valve member carried in said chamber for movement between a first position connecting said fuel pump to said cylinders to provide for fuel injection when said pistons are adjacent top dead center, and a second position connecting said fuel pump to said cylinders to provide for fuel injection when said pistons are adjacent bottom dead center, said valve member including a pair of indepedent flow passage means communicable with said inlet ports when said valve member is in its first and second positions.

5. An engine in accordance with claim 4 including temperature responsive means on said engine for shifting said valve member to said first position when the engine temperature is below a predetermined level and to said second position when said temperature is above said predetermined level.

6. An engine in accordance with claim 4 including manual means for shifting said valve member between said first and second positions.

7. A spark ignition, internal combustion engine including a plurality of cylinders, a piston reciprocably movable in each of said cylinders, a crankshaft connected to each of said pistons, and a fuel injection pump including support means, an actuating cam mounted on said support means for rotation in timed relation with said crankshaft, a pump body including a series of pump units corresponding in number to the number of engine cylinders and arranged in parallel relation to and at equal radial distances from said central axis, each of said pump units communicating with an associated one of said engine cylinders and being engaged by said cam incident to rotation thereof to effect fuel injection into the associated engine cylinder, means mounting said pump body on said support means for rotational displacement about a central axis in alignment with the rotational axis of said cam throuhg approximately 180 degrees between a first position effective for injecting fuel into said cylinders when said pistons are adjacent top dead center and a second position effective for injecting fuel into said cylinders when said pistons are adjacent bottom dead center, and means for rotatively displacing said pump body between said first and second pistons.

8. An engine in accordance with claim 7 wherein said means for rotatively displacing said pump body includes temperature responsive means for effecting displacement of said pump body to said first position when the engine temperature is below a predetermined level, and to said second position when the engine temperature is above said predetermined level.

9. A fuel injection pump for a spark ignition, internal combustion engine including a cylinder, a piston reciprocably movable in said cylinder, and a crankshaft connected to said piston, said pump including support means, an actuating cam mounted on said support means for rotation in timed relation with the crankshaft, a pump body mounted on said support means for rotative displacement about a central axis in alignment with the rotational axis of said cam between a pair of positions displaced 180 degrees from each other and including a pump unit arranged in parallel eccentric relation to said central axis, said pump units including means adapted for communicating with the cylinder and being engaged by said cam to effect fuel ejection therefrom incident to rotation of said cam and means for alternatively locating said pump body at each of said pair of positions.

10. A fuel injection pump for a spark ignition, internal combustion engine including a plurality of cylinders, a piston reciprocably movable in each of said cylinders, and a crankshaft connected to each of said pistons, said pump including support means, an actuating cam mounted on said support means for rotation in timed relation with the crankshaft, a pump body mounted on said support means for rotative displacement about a central axis in alignment with the rotational axis of said cam between a pair of positions displaced 180 degrees from each other and including a series of pump units arranged in parallel relation to and at equal radial distances from said central axis, each of said pump units including means adapted for communicating with an associated one of the cylinders and being engaged by said cam to effect fuel ejection therefrom incident to rotation of said cam, and means for alternatively locating said pump body at each of said pair of positions.

11. A spark ignition, internal combustion engine including a cylinder, a piston reciprocably movable in said cylinder, and means for selectively and alternatively injecting fuel into said cylinder when said piston is adjacent top dead center and when said piston is adjacent bottom dead center, said means for injecting fuel including temperature responsive means operable, when the engine temperature is above a predetermined level, to effect fuel injection when said piston is adjacent bottom dead center and, when the engine temperature is below said predetermined level, to effect fuel injection when said piston is adjacent top dead center.

12. A method of operating a spark ignition, internal combustion engine including a cylinder with a spark plug at one end, a piston reciprocal in said cylinder relative to said spark plug, and means for injecting fuel into said cylinder, said method comprising the steps of sensing the temperature condition of the engine relative to a predetermined level, varying the time of fuel injection independently of variation in the quantity of injected fuel to afford fuel injection into the cylinder when the piston is proximate the spark plug when the engine temperature condition is below said predetermined level, and to afford fuel injection into the cylinder when the piston is relatively remote from the spark plug when the engine temperature condition is above said predetermined level.

13. A spark ignition, internal combustion engine including a cylinder, a spark plug at the head end of said cylinder, a piston reciprocably movable in said cylinder relative to said spark plug, means for injecting fuel into said cylinder, and temperature responsive means for varying the time of fuel injection independently of variation in the quantity of injected fuel, said temperature responsive means being operable to inject fuel into said cylinder when said piston is relatively proximate to said spark plug in response to an engine temperature condition below a predetermined level and to inject fuel into said cylinder when said piston is relatively remote from said spark plug in response to an engine temperature condition above said predetermined level.

14. An engine in accordance with claim 13 wherein said fuel injection means includes a member shiftable between a first position located to effect fuel injection when said piston is proximate to said spark plug, and a second position spaced from said first position and located to effect fuel injection when said piston is remote from said spark plug.

15. A spark ignition, internal combustion engine including a cylinder, a spark plug at the head end of said cylinder, a piston reciprocably movable in said cylinder relative to said spark plug, a crankshaft connected to said piston, a fuel injection pump comprising support means, an actuating cam drivingly connected with said crankshaft for rotation in timed relation therewith, a pump body including a pump unit communicating with said cylinder and means mounting said pump body and said cam on said support means for rotation of the latter by said crankshaft, for location of said pump unit in parallel spaced relation to the axis of rotation of said cam and in position for engagement by said cam in response to rotation thereof by said crankshaft to effect pumping operation of said pump unit, and for relative rotative displacement between said cam and said pump body independently of the rotation of said cam by said crankshaft, and temperature responsive means connected to said fuel injection pump for effecting relative rotative displacement between said pump body and said cam so as to vary the time of operation of said pump independently of variation in the quantity of fuel pumped to afford pumping operation of said pump unit by said cam when said piston is proximate to said spark plug in response to an engine temperature condition below a predetermined level and to afford pumping operation of said pump unit by said cam when said piston is remote from said spark plug in response to an engine temperature condition above said predetermined level.

16. A spark ignition internal combustion engine including a cylinder, a piston reciprocably movable in said cylinder, a crankshaft connected to said piston, and means including a fuel injection pump, means operating said pump in timed relation to crankshaft rotation, and a conduit communicating between said injection pump and said cylinder, for selectively and alternatively injecting fuel into said cylinder only when said piston is adjacent bottom dead center and when said piston is adjacent top dead center.

References Cited by the Examiner

UNITED STATES PATENTS

| 2,001,843 | 5/35 | Kasley | 123—32 |
| 2,005,063 | 6/35 | Wild et al. | 123—32 |
| 2,010,469 | 8/35 | Triebnigg | 123—32 |
| 2,025,362 | 12/35 | Starr | 123—32 |
| 2,916,023 | 12/59 | Sanborn | 123—32 |
| 2,974,657 | 3/61 | Bessiere | 123—139 |

FOREIGN PATENTS 840,465    1/39    France.

RICHARD B. WILKINSON, *Primary Examiner.*